US009548992B2

(12) United States Patent
Flowers

(10) Patent No.: US 9,548,992 B2
(45) Date of Patent: Jan. 17, 2017

(54) SYSTEM AND METHOD FOR DETECTING NETWORK ACTIVITY OF INTEREST

(71) Applicant: TrustPipe LLC, Healdsburg, CA (US)

(72) Inventor: John S. Flowers, San Francisco, CA (US)

(73) Assignee: TRUSTPIPE LLC, Healdsburg, CA (US)

( * ) Notice: Subject to any disclaimer, the term of this patent is extended or adjusted under 35 U.S.C. 154(b) by 107 days.

(21) Appl. No.: 14/407,445

(22) PCT Filed: Dec. 28, 2012

(86) PCT No.: PCT/US2012/072170
§ 371 (c)(1),
(2) Date: Dec. 11, 2014

(87) PCT Pub. No.: WO2013/176704
PCT Pub. Date: Nov. 28, 2013

(65) Prior Publication Data
US 2015/0163230 A1    Jun. 11, 2015

Related U.S. Application Data

(63) Continuation of application No. 13/479,222, filed on May 23, 2012, now Pat. No. 8,347,391.

(51) Int. Cl.
*G06K 9/62* (2006.01)
*H04L 29/06* (2006.01)
(52) U.S. Cl.
CPC ......... *H04L 63/145* (2013.01); *H04L 63/1408* (2013.01)
(58) Field of Classification Search
USPC 382/128, 231, 132, 209, 224, 282; 128/922, 923
See application file for complete search history.

(56) References Cited

U.S. PATENT DOCUMENTS 5,912,986 A  *  6/1999  Shustorovich  ...........  G06K 9/32
                                                        382/156
6,028,956 A  *  2/2000  Shustorovich  .......  G06K 9/3233
                                                        382/156
(Continued)

FOREIGN PATENT DOCUMENTS

GB   2406485 A     3/2005
WO   03/100616 A1  12/2003
(Continued)

OTHER PUBLICATIONS

Final Office Action received for U.S. Appl. No. 13/710,322, mailed on Apr. 15, 2016, 17 pages.
(Continued)

*Primary Examiner* — Yosef Kassa
(74) *Attorney, Agent, or Firm* — Morrison & Foerster LLP

(57) ABSTRACT

Systems and methods for detecting a visual characteristic of interest within an image are disclosed. An example method involves obtaining an image that includes at least one pixel representing a visual characteristic of interest, creating a first sequence and a second sequence of bitwise data from values associated with the pixel, and converting these bitwise sequences into a first sequence of integers and a second sequence of integers. Using a distance function, a similarity metric is determined between the first sequence of integers and the second sequence of integers. Based on the similarity metric, a third sequence of integers is created and stored. The third sequence of integers can be used to facilitate the identification of the visual characteristic of interest in other images.

38 Claims, 13 Drawing Sheets

(56) References Cited

U.S. PATENT DOCUMENTS

| | | | |
|---|---|---|---|
| 6,891,978 B1 * | 5/2005 | Takano | G06T 11/60 |
| | | | 382/284 |
| 6,920,504 B2 | 7/2005 | Bender et al. | |
| 7,336,378 B2 * | 2/2008 | Ichikawa | H04N 1/3875 |
| | | | 358/1.11 |
| 8,347,391 B1 | 1/2013 | Flowers | |
| 8,661,241 B1 | 2/2014 | Orr | |
| 8,726,382 B2 | 5/2014 | Knapp et al. | |
| 2007/0150954 A1 | 6/2007 | Shon | |
| 2008/0052774 A1 | 2/2008 | Chesla et al. | |
| 2008/0134329 A1 | 6/2008 | Perreault et al. | |
| 2008/0141374 A1 | 6/2008 | Sidiroglou et al. | |
| 2009/0158435 A1 | 6/2009 | Milliken et al. | |
| 2010/0050256 A1 | 2/2010 | Knapp et al. | |
| 2010/0077483 A1 | 3/2010 | Stolfo et al. | |
| 2010/0106976 A1 | 4/2010 | Aciicmez et al. | |
| 2012/0227108 A1 | 9/2012 | Noel et al. | |
| 2014/0068023 A1 | 3/2014 | Arickan | |

FOREIGN PATENT DOCUMENTS

| | | |
|---|---|---|
| WO | 2007/070838 A2 | 6/2007 |
| WO | 2007/070838 A3 | 7/2008 |

OTHER PUBLICATIONS

"IP.com Searches." Jun. 5, 2014, 9 pages.

Non Final Office Action received for U.S. Appl. No. 13/479,222 on Aug. 3, 2012, 12 pages.

Notice of Allowance received for U.S. Appl. No. 13/479,222, mailed on Nov. 28, 2012, 5 pages.

Non-Final Office Action received for U.S. Appl. No. 13/710,322, mailed on Dec. 14, 2015, 13 pages.

Non-Final Office Action received for U.S. Appl. No. 13/710,322, mailed on Mar. 27, 2015, 15 pages.

Notice of Allowance received for U.S. Appl. No. 13/752,268, mailed on Jun. 24, 2014, 10 pages.

Notice of Allowance received for U.S. Appl. No. 14/490,543, mailed on Jan. 21, 2016, 10 pages.

"Google Patent Search." Jun. 5, 2014, 2 pages.

IP.com, "A Method to send multi TCP packets over an IP packet", Prior Art Database Technical Disclosure, IP.com No. IPCOM000219755D, Jul. 11, 2012, 8 pages.

International Preliminary Report on Patentability received for PCT Patent Application No. PCT/US2012/72170, mailed on Jun. 11, 2013, 7 pages.

International Search Report and Written Opinion received for PCT Patent Application No. PCT/US2012/72170, mailed on Mar. 18, 2013, 8 pages.

International Preliminary Report on Patentability received for PCT Patent Application No. PCT/US2014/013136, mailed on Sep. 24, 2015, 8 pages.

International Search Report and Written Opinion received for PCT Patent Application No. PCT/US2014/013136 mailed on Jun. 13, 2014, 9 pages.

* cited by examiner

| | FREQUENCY |
|---|---|
| 920 — 101 48 52 . . . | 80% |
| 921 — 101 48 52 . . . | 80% |
| 922 — 53 101 . . . | 30% |

| | |
|---|---|
| | NORMAL |
| | ABNORMAL |
| | ABNORMAL |
| | NORMAL |
| | NORMAL |
| | NORMAL |
| | NORMAL |
| | NORMAL |
| | ABNORMAL |

SYSTEM AND METHOD FOR DETECTING NETWORK ACTIVITY OF INTEREST

CROSS-REFERENCE TO RELATED APPLICATION

This application claims priority to U.S. non-provisional application Ser. No. 13/479,222, filed May 23, 2012, which is hereby incorporated by reference in its entirety for all purposes.

BACKGROUND

1. Field

The present disclosure relates generally to the field of digital security, and more specifically to detecting activities of interest in network traffic, including the detection of malicious network activities.

2. Description of Related Art

The proliferation of computing technologies has presented challenges in the field of digital security. As is well known, a networked computer (i.e., a network node) may spread malicious computer data to other network nodes, thereby inflicting system disruption and possibly economic loss. One of ordinary skill in the art would appreciate that attacks based on malicious computer data include computer viruses, malware, worms, Trojan horses, bots, intrusions (e.g., unauthorized access), exploits (e.g., escalation of privileges, violation of confidentiality), time-based attacks (e.g., Denial of Service), or the like. The term "threat" is used to describe one or more of these types of attacks.

Digital security technologies may be used to detect and/or remove malicious computer data from network traffic. One of ordinary skill in the art would appreciate that digital security technologies can reside at various network nodes, can be packaged in hardware and/or software, and can include "anti-virus software", "malware detection", "intrusion prevention", "anti-attack", firewall, or the like, though the terms are not identical in meaning. The term "Unified Threat Management" ("UTM") has been used to describe one or more of these implementations of digital security technologies.

Conventional digital security technologies typically detect threats using signatures that correspond to specific threats. Existing designs under this paradigm are deficient in at least two ways. First, the detection of a threat relies on the a priori knowledge of the specific threat and the availability of a signature for the specific threat. For example, conventional digital security technologies may rely on a known signature to detect the presence of a known computer virus. Thus, conventional digital security technologies may not be able to detect threats for which a signature is not yet available. For example, conventional digital security technologies may not be able to detect an unknown variation of a known computer virus.

Second, due to the ever-increasing number of known threats, conventional digital security technologies maintain a growing number of signatures. As incoming network traffic is obtained, the maintained signatures are scanned against incoming data for possible threats. The scanning process uses substantial computing resources. By one estimate, in the context of enterprise level data centers, up to 85% of a data center's computing power may be spent on digital security operations, leaving only a fraction of its true capability to business operations. In the context of consumer computers, it should not surprise even the casual computer user that the operation of anti-virus software can cause a computer to become sluggish.

Despite improvements in the field, conventional digital security technologies continue to be limited by these deficiencies, which are consequences of their design.

BRIEF SUMMARY

In one exemplary embodiment, a plurality of Transmission Control Protocol (TCP) packets and a plurality of Internet Protocol (IP) packets are obtained from network traffic. The obtained network packets include a network activity of interest. A plurality of combined packets is created. A first combined packet of the plurality of combined packets comprises a portion of at least one of the plurality of TCP packets and a portion of at least one of the plurality of IP packets. A second combined packet of the plurality of combined packets comprises a portion of at least one of the plurality of TCP packets and a portion of at least one of the plurality of IP packets. The first and second combined packets are different. A relevant subset of the first and second combined packets is converted into sequences of integers. A similarity metric is determined between the first and second sequences of integers. A third sequence of integers is created based on the similarity metric, wherein the third sequence comprises a third plurality of integers common to the first sequence and the second sequence, in the order in which the common integers were presented in the first sequence. A fourth sequence of integer is created based on the frequency in which the third sequence of integers appears, in the same order, in the plurality of combined packets. The fourth sequence of integers is used to identify network activities of interest in an unknown set of network traffic.

In one exemplary embodiment, a plurality of Transmission Control Protocol (TCP) packets and a plurality of Internet Protocol (IP) packets are obtained from network traffic. A plurality of combined packets is created. A combined packet comprises a portion of at least one of the plurality of TCP packets and a portion of at least one of the plurality of IP packets. A sequence of integers is obtained. If the integers of the sequence of integers appear in the combined packet in the same order, the combined packet is considered abnormal, a network operation is initiated. The network operation may be a user alert, an instruction to cloak a network node, or an instruction to drop a network packet from transmission.

In one exemplary embodiment, a computer image that includes an area of interest is obtained. The computer image may be a medical radiology image. The area of interest may represent deleterious tissue. Multiple sequences of bitwise data are created for each pixel of the computer image. For a given pixel that is being processed, a sequence of bitwise data can be created based on other pixels that separate the given pixel from an edge of the computer image. Because there are multiple paths from a given pixel to the various edges of a computer image, multiple sequences of bitwise data can be created for each pixel of the computer image. Further, because there are multiple pixels in the computer image, additional sequences of bitwise data are created for each pixel. The resulting sequences of bitwise data are each converted into a sequence of integers, thereby producing multiple sequences of integers. A similarity metric is determined between a first and a second sequence of the sequences of integers. A third sequence of integers is created based on the similarity metric, where the third sequence comprises a plurality of integers common to the first and the second sequences, in the order in which the common integers were presented in the first sequence. A fourth sequence of integers, referred to as a meta-expression, is created based on the frequency in which the third sequence of integers appears, in the same order, in the multiple sequences of integers that were originally created from the computer image. The meta-expression is used to identify areas of interest in an unknown computer image.

DESCRIPTION OF THE FIGURES

FIGS. 9(A)-(F) depict exemplary network packets.

FIG. 11 depicts exemplary sequences of 8-bit integers.

FIG. 12 depicts exemplary groups of network packets.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The embodiments described herein include techniques for detecting network activities of interest. Exemplary network activities of interest include threats based on computer viruses, malware, worms, Trojan horses, bots, intrusions (e.g., unauthorized access), exploits (e.g., escalation of privileges, violation of confidentiality), timed-based attacks (e.g., Denial of Service), or the like. Exemplary network activities of interest may also include illicit downloads of copyrighted and/or obscene materials via a network.

1. Overview

Figure 1:
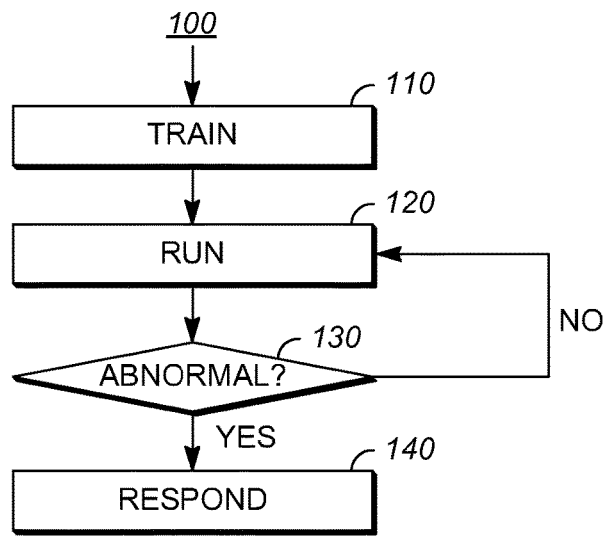
FIG. 1 depicts an exemplary process for detecting network activities of interest.

FIG. 1 illustrates exemplary process 100 for detecting network activities of interest. For purposes of this disclosure, the term "Unified Threat Management System" (UTMS) is used to describe computer security technologies that carry out process 100, regardless of whether the technologies are provided in software form (e.g., as a software package) or in hardware form (e.g., an application-specific circuit or device). Within process 100, block 110 may be referred to as a training process, while blocks 120-140 may be collectively referred to as a run-time process.

At block 110, a UTMS is trained to recognize characteristics in network traffic that are associated with a network activity of interest. For example, the UTMS may be provided with a series of network traffic that reflects a particular, known threat. Such a series of training network traffic may be obtained from, for example, a network packet capture application programming interface ("API"), such as "pcap". Training network traffic may also be obtained from internet repositories of network traffic, such as from the Openpacket organization. Although the names of APIs and/or repositories may change from time to time, the concept of capturing network traffic should be within the grasp of one of ordinary skill in the art.

At block 110, the UTMS identifies from the training network traffic bounded sequences of computer data that can be used later to identify the presence of the same network activities of interest in another, unknown set of network traffic. In addition, by way of processing at block 110, the UTMS also becomes able to identify the presence of threats that are related to the threat that was previously provided in the training network traffic (i.e., a variant).

At block 120, the UTMS monitors a set of network traffic to determine whether the (trained and related) network activities of interest are present in the network traffic. For example, the UTMS may determine if one node in the network is attempting to attack another network node with a variation of the threat previously provided in the training network traffic to block 110.

At decision block 130, the UTMS determines whether the monitored set of network traffic is normal or abnormal. Abnormal network traffic are those that in which the UTMS has identified a network activities of interest. If abnormal network traffic is found, processing proceeds to block 140, where the UTMS generates one or more appropriate responses. An appropriate response may be a user or system alert. Another appropriate response may be to scrub the response from the compromised network node, such that the intruding network node remains unaware of the "successful" attack. Yet another appropriate response may be to cloak the network node that is targeted for attack, so that the attacking network node can no longer reach the target network node. If no abnormal network traffic is found, processing returns to block 120, and the UTMS monitors another set of network traffic.

Figure 2:
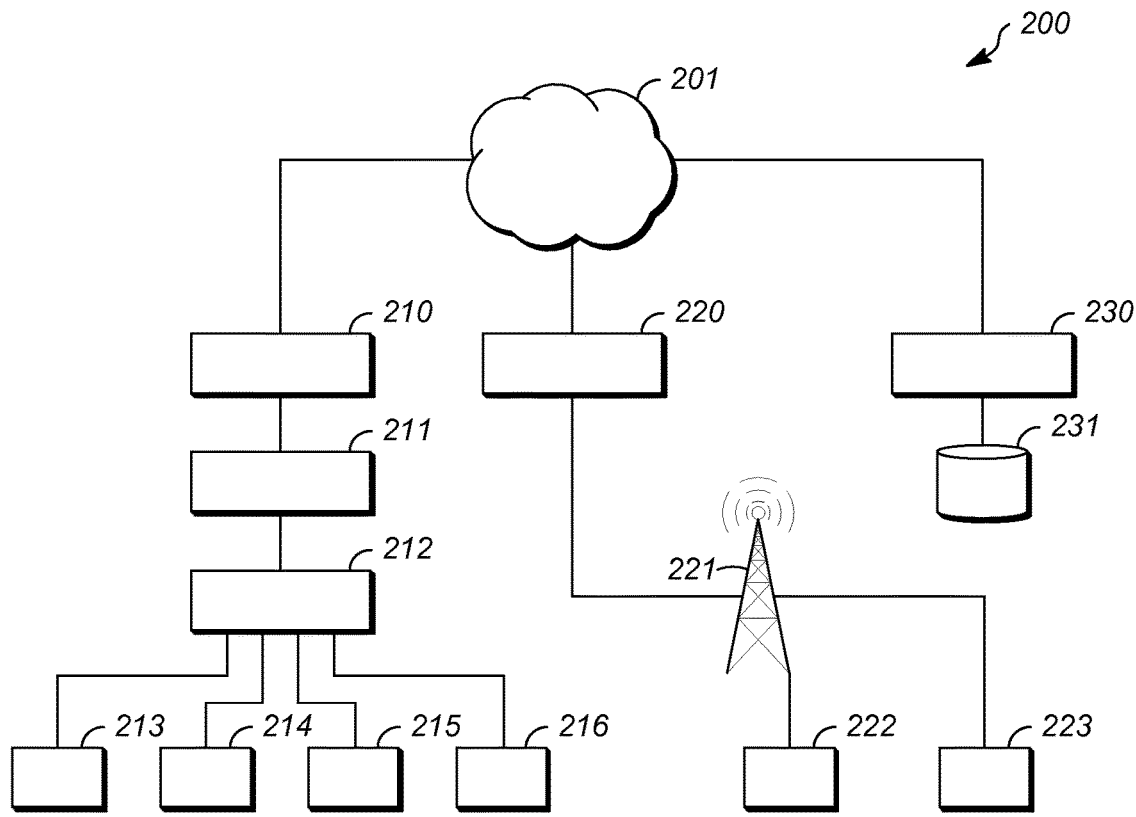
FIG. 2 depicts a block diagram of a network employing exemplary embodiments of network activity detectors.

FIG. 2 is a network diagram illustrating an exemplary deployment of process 100 (FIG. 1) onto a network. As shown in FIG. 2, desktop and laptop computers 213-216 are connected to cloud network 201 via cable modem 210, firewall 211, and router 212. Cellular phone 222 and tablet computer 223 are connected to network 201, wirelessly, via cellular service provider 220. Data center 231 is connected to cloud network 201 via modem 230. Portions of process 100 may be deployed onto network devices (e.g., firewall 211, router 212), endpoints (e.g., computers 213-216), gateway devices (e.g., modem 210, a gateway), mobile devices (e.g., cellular phone 222, tablet computer 223), or the like. In other words, portions of process 100 can be deployed onto one or more of network nodes 210-216, 220-223, and/or 230-231. For example, process 100 may be integrated into an operating system kernel running on cellular phone 222, tablet computer 223, and/or computers 213-216. Process 100

(FIG. 1) may also be integrated into the hardware of cable modem 210, UTMS 211, and/or router 212.

In the discussion below, the threat of computer viruses is used as an exemplary network activity of interest for sake of simplicity. However, process 100 (FIG. 1) is not so limited. Rather, process 100 may be used by a UTMS to manage many other kinds of network activities of interest, as discussed above. Coincidentally, the (exemplary) discussion of computer viruses highlights the substantial advantages of process 100 in a way that is understandable to many computer users.

At present, over 2 million computer viruses are known to exist. The exact count varies between 2.5 million and 8 million, because different sources of authority catalogue computer viruses differently. At block 110 of process 100, a UTMS may be provided with network traffic that reflects attacks based on one or more known computer viruses. At the completion of block 110, the UTMS becomes trained to detect the presence of those one or more computer viruses, as well as their variants, in network traffic. At blocks 120-140, the UTMS monitors network traffic for the presence of those one or more computer viruses and their variants. In this way, the UTMS is able to manage attacks that are based known threats and their unknown variants.

Process 100 is notable in at least two ways. First, block 110 produces bounded sequences of data that can be used to detect all known computer viruses and their variants. Thus, a UTMS using process 100 need not necessarily rely on the a priori knowledge of a specific computer virus in order to detect the computer virus in network traffic during operation. Second, block 110 produces bounded sequences of data that are efficient in structure and in size as compared to computer viruses signature files that are used by conventional computer anti-virus technologies. Specifically, it has been determined that bounded sequences of data totaling less than 200 (8-bit) bytes are sufficient to identify most, if not all, of the computer viruses presently known to exist under process 100. This size stands in stark contrast to the size of conventional computer viruses signature files, which range from 50 megabytes (MB) to 300 MB in size. To put into perspective, the size of 50 MB is larger than the size of 200 (8-bit) bytes by 5 orders of magnitude. Thus, tremendous computational efficiencies can be realized during operation of a UTMS using process 100.

2. Training

Figure 3:
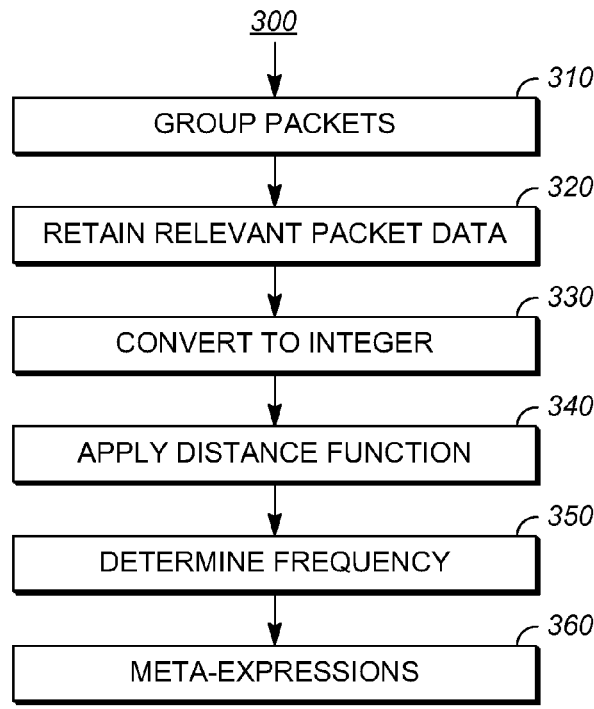
FIG. 3 depicts an exemplary process for training a Unified Threat Management System (UTMS).

FIG. 3 illustrates an exemplary process 300 for training a UTMS. In one embodiment, process 300 performs the features of block 110 (FIG. 1). At block 310, network traffic is obtained, and a series of network packets that are sent between (i.e., to and from) two network nodes are grouped together. Some or all of the grouped network packets may be consecutive. The concept of "network packets" is well known in the art and is not detailed here. As an example, the term "network packets" may refer to Ethernet packets, Transmission Control Protocol (TCP) packets, Internet Protocol (IP) packets, or the like.

Network packets that are provided to block 310 should include a network activity of interest, for purposes of training a UTMS. In the present example, the network activity of interest is the presence of a computer virus in the network traffic between two network nodes. Thus, the network packets provided to block 310 should represent an attack, by one network node against another network node, using a computer virus, and should also represent the resulting responses from the network node that is attacked.

The grouping of network packets between two network nodes at block 310 is bidirectional because network traffic both to and from a pair of network nodes are grouped together. Bidirectional network traffic typically consists of different levels of communication, from the initial handshake to the full transfer of data between the two network nodes. This grouping of (bidirectional) network packets is based on the existence of an established communication between two network nodes. An established communication between two network nodes is sometimes referred to as a "conversation". Two network nodes may request to establish a communication via one channel. For example, a host and a server may handshake on one port. Once communication is established, the two network nodes may communicate further through a newly created channel. For example, the host and the server may communicate through TCP/IP on another port that is different from the port through which the established communication was initially requested.

In one embodiment, the grouping of (bidirectional) network packets at block 310 begins with the identification of a network packet in network traffic that represents the beginning of an established communication, and another network packet in the network traffic that represents the end of the established communication. The beginning of an established communication may be a network packet that contains a request. The end of an established communication may be a network packet that contains a corresponding acknowledgment. In one embodiment, additional network packets may be identified, such as a network packet that represents a "request-acknowledgement". Network packets at different layers of the OSI model may provide request and acknowledgement information. For example, both HTTP network packets (i.e., at the OSI application layer) and TCP network packets (i.e., at the OSI transport layer) contain request fields, either of which is sufficient for purposes of block 310. In this way, block 310 may group together bidirectional network packets that correspond to an established communication without relying on source network addresses and destination addresses. Block 310 may also group together bidirectional network packets that correspond to an established communication without relying on source and destination port numbers.

Figure 4:
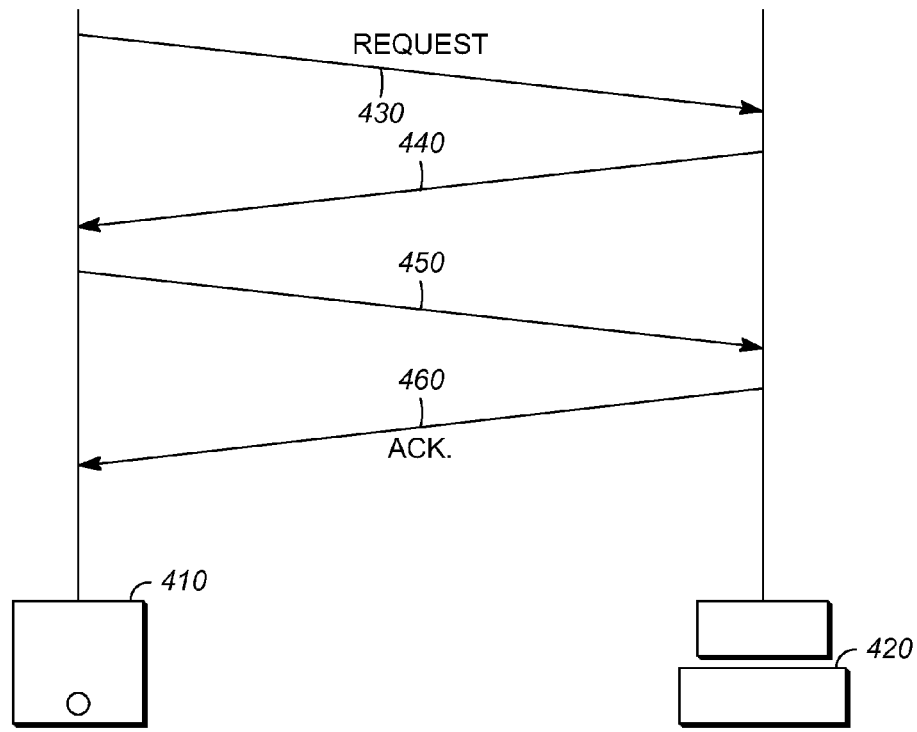
FIG. 4 depicts an exemplary transmission of network packets between network nodes.

Block 310 is now discussed with reference to FIG. 4. As shown, network packets 430-460 represent a series of network packets between network nodes 410 and 420. Network packet 430 is sent by network node 410 to network node 420, and includes a request. Thus, network packet 430 indicates the beginning of a series of network packets that are to be grouped together. In this context, network node 410 may be referred to as a host because it initiated a request, and network node 420 may be referred to as a server because it is the recipient of the request. Network packets 440 and 450 are sent by network nodes 420 and 410, respectively, and represent bidirectional communication of data between the two network nodes that should be grouped together. Network packet 460 is sent by network node 420 to network node 410 to acknowledge that an appropriate amount of data has been received. Thus, network packet 460 indicates the end of the series of network packets that are to be grouped together. In this way, network packets 430 to 460 are grouped together at block 310 (FIG. 3) into a bounded group of network packets. This group of network packets is referred to as being "bounded" because there is a clear beginning and a clear end to the group of data. Block 310 may be repeated to produce additional groups of bidirectional network packets between pairs of network nodes.

It should be appreciated that the grouping of network packets, carried out at block 310, also implicitly captures other types of information that are useful for detecting network activities of interest. For example, in a Denial of Service attack ("DoS"), which is a type of time-based attack, a relatively large number of network packets are transmitted over a given timeframe. The occurrence of network packets over a relevant timeframe that result from a DoS attack (or more generally, a timed-based attack) is implicitly captured at block 310 because block 310 groups together those network packets into (bi-directional) conversations. The grouped network packets are then analyzed for information relevant to detecting a future DoS attack by downstream processes in process 300.

Figure 5:
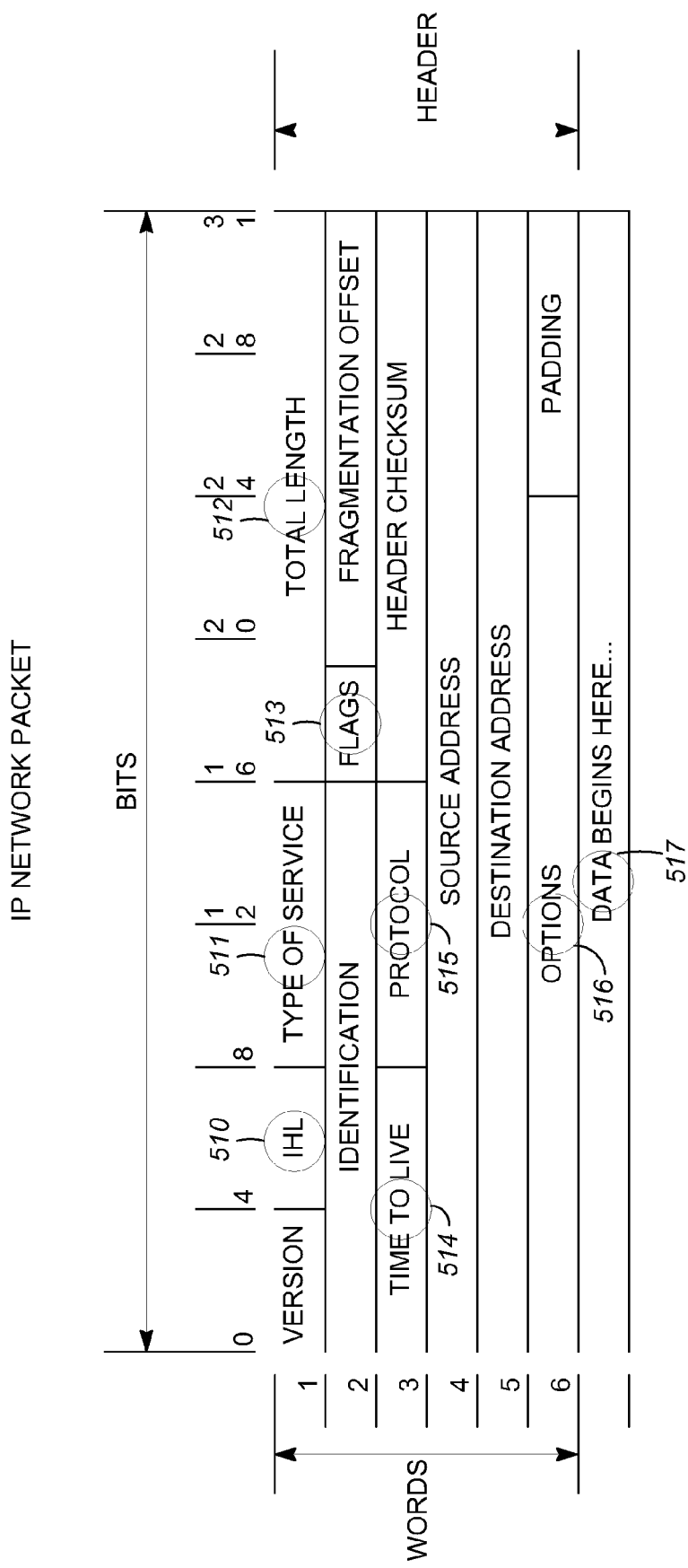
FIG. 5 depicts the layout of an IP packet header.
Figure 6:
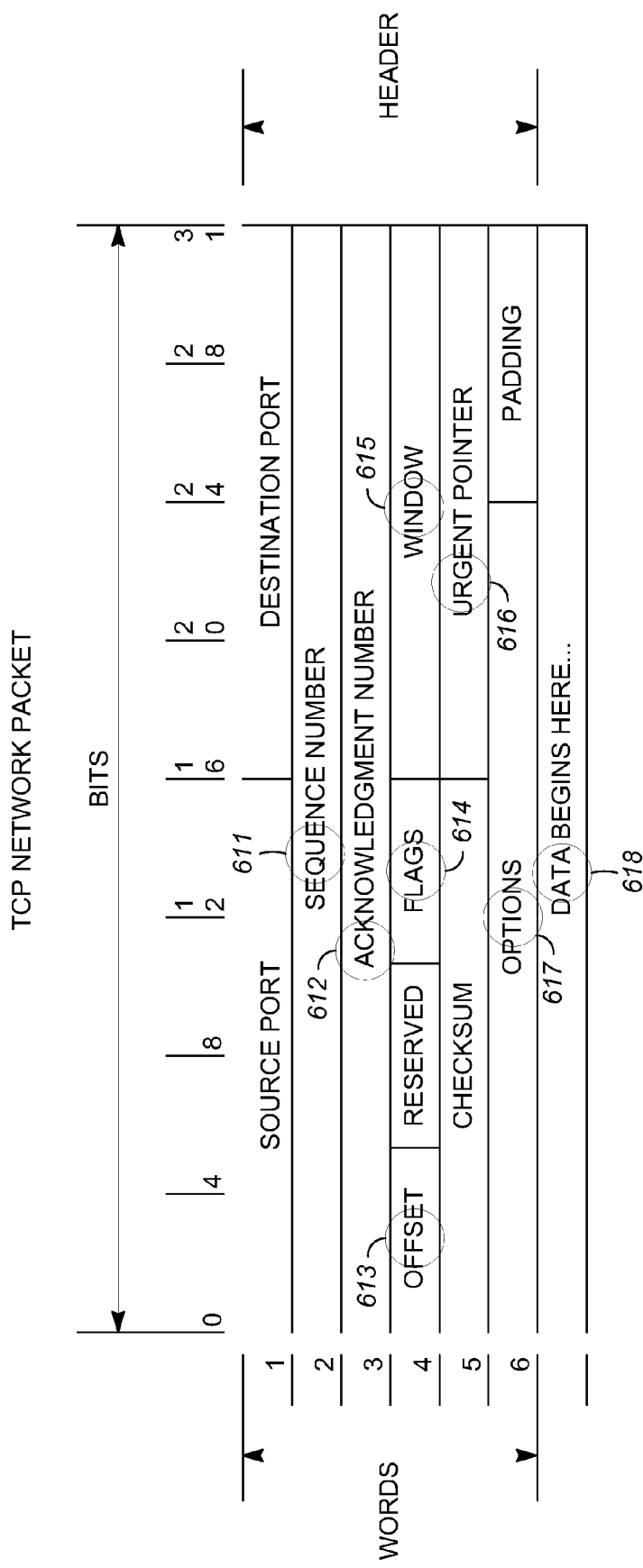
FIG. 6 depicts the layout of a TCP packet header.

Only certain fields within the network packets that are grouped by block 310 are relevant to detecting network activities of interest. At block 320, the relevant information is retained, and extraneous information is discarded. Block 320 is now discussed with reference to FIGS. 5 and 6. FIG. 5 illustrates the layout of an IP network packet, with the fields relevant to detecting network activities of interest circled. These relevant fields include Type of Service ("TOS") 511, Total Length (of IP network packet) 512, IP Flags 513, Time to Live 514, Protocol 515, IP Options 516, and data content 517. FIG. 6 illustrates the layout of a TCP network packet, with the fields relevant to detecting network activities of interest (e.g., computer viruses) circled. These fields include Sequence Number 611, Acknowledgement Number 612, Offset 613, TCP Flags 614, Window 615, Urgent Pointer 616, TCP Options 617, and data content 618. In this way, the output of block 310 is reduced to contain only information that is relevant to detecting network activities of interest. This retention process is applied to each IP and TCP network packet that is in the groups of network packets produced by block 310. The output of block 320 is referred to as "reassembled packets".

Three aspects of block 320 are noteworthy. First, block 320 does not retain the source or destination addresses in an IP network packet or the source or destination port numbers in a TCP network packet. Thus, a UTMS using process 300 does not need to rely on network address nor port information in order to detect network activities of interest. Second, Header Length (IHL) 510 (FIG. 5) is used to determine the length of an IP network packet header so that the relevant fields within the IP network packet can be properly grouped, but Header Length (IHL) 510 is not itself retained in the output of block 320. Third, the retained fields are not limited to the detection of computer viruses, which is the network activity of interest in the present example. Rather, the fields support the detection of the full-range of network activities of interest as discussed above.

At block 330, the reassembled packets (i.e., relevant information) from block 320 are converted, bitwise, into integers, thereby producing sequences of integers that correspond to a subset of the information originally provided to process 300. In one embodiment, 8-bit integers are used. One of ordinary skill in the art would appreciate that IP and TCP network packets contains fields that are less than 8 bits, exactly 8 bits, and more than 8 bits long. Fields that span less than 8-bits are converted to 8-bit representation by padding zeros to the most significant output bits. For example, block 320 converts bits "100" to "0000 0100". TOS 511 and IP Flags 513 (FIG. 5), which are 4-bit and 3-bit fields, respectively, are converted in this way. Fields that span more than 8-bits are converted into multiple 8-bit segments. For example, block 320 converts bits "0001 0010 0100 1000" to "0001 0010" and "0100 1000". Data content 517, which spans more than 8-bits, is converted in this way.

Figure 7:
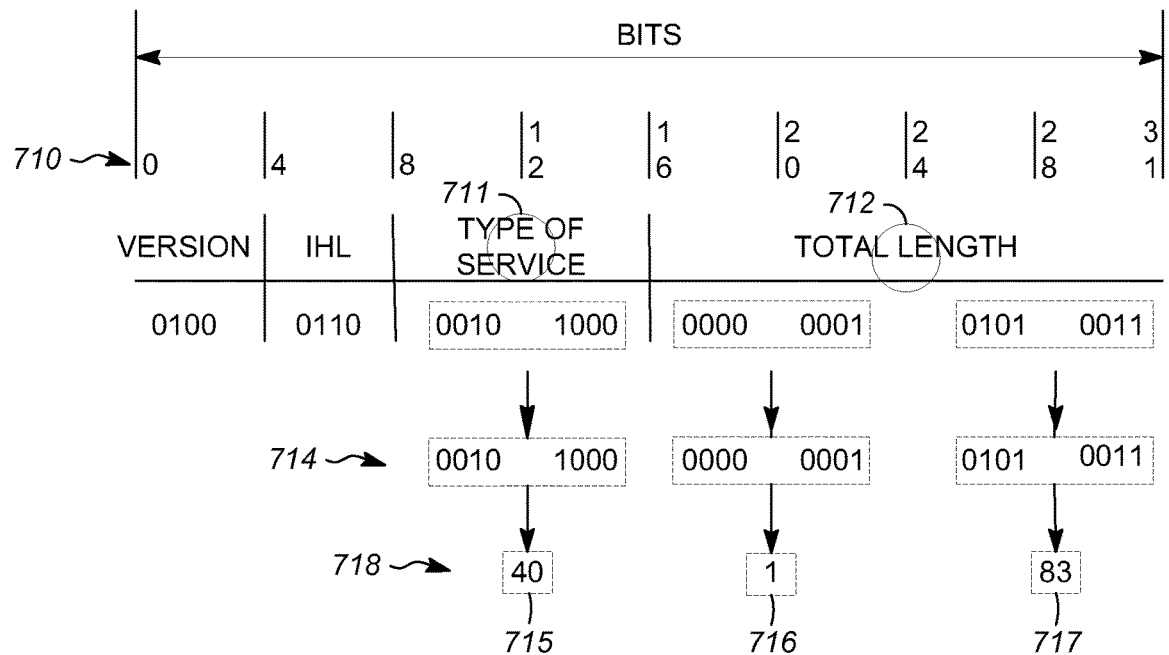
FIG. 7 depicts exemplary values in an IP network packet header.

Blocks 320 and 330 are now discussed with reference to FIG. 7. FIG. 7 illustrates a portion of an IP network packet.

As discussed above, within IP network packet 710, TOS 711 and Total Length 712, among others, are useful for detecting network activities of interest. Thus, fields 711 and 712 are retained by block 320 and are provided to block 330 for conversion to integers. Reassembled packet 714 represents the portions of IP network packet 710 that are retained by block 320. Block 330 converts the contents of reassembled packet 714, bitwise, into 8-bit integers 715, 716, and 717. Note, for sake of simplicity, only a portion of an IP network packet 710 is shown in FIG. 7. During normal operation, block 320 processes the entire groups of IP and TCP network packets produced by block 320, and block 330 in turn processes the entire groups of IP and TCP network packets retained by block 320. In this way, block 330 produces a sequence of 8-bit integers 718 containing the integers "40 1 83 . . . ". Optionally, sequence of 8-bit integers 718 may be limited to 65,536 (8-bit) integers in length.

As used here, the term "sequence" describes a list of ordered elements, e.g., integers. It should be appreciated that the ordering of elements within sequence of integers 718 is derived from the ordering and adjacency of relevant portions of bidirectional network traffic processed by blocks 310-320. Put another way, to the extent that a network activity of interest produces a characteristic response in network traffic as between two network nodes, that response is captured by the processes of blocks 310-330. The response is further distilled in the processes of blocks 340-360, discussed below, so that it becomes useful for detecting network activities of interest in an unknown set of network traffic.

At block 340, a distance function is used to identify characteristics from the sequences of integers produced by block 330. The distance function is performed against sequences of integers that are adjacent in time, meaning that a sequence of integers produced by block 330 (based on one group of network packets from block 320) is compared against the next, adjacent sequence of integers produced by block 330 (based on the next, adjacent group of network packets from block 320).

Conventional distance functions, such as string distance functions, are well known in the art and are not discussed in detail here. As an example, a conventional string distance function may be used to determine that the strings "a b c" and "z b c" have a distance of 1, because the strings vary only in that "a" in the former is replaced with "z" in the latter, and represents the sole difference between the two strings. The groups of network packets produced by block 330 lend themselves to comparison by distance functions because block 330 produces sequences of integers, which may be treated as individual elements by a distance function. Conventional string distance functions, however, do not provide distance metrics that are sufficient for detecting network activities of interest. For example, the knowledge that two strings differ by a distance of 1 provides little useful information for computer virus detection.

Figure 8:
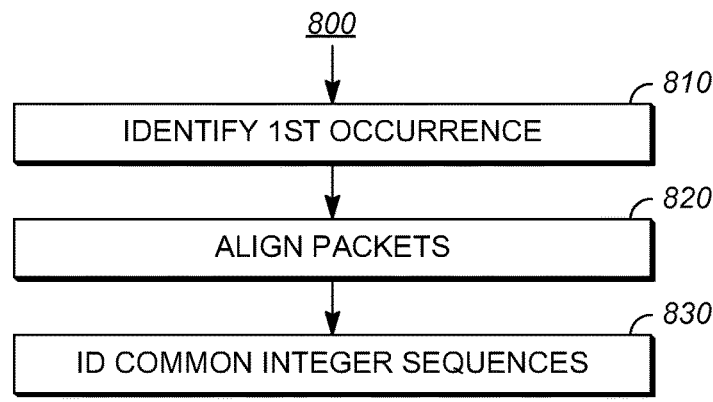
FIG. 8 depicts exemplary processes in an embodiment of a distance function.

In one embodiment, block 340 performs a custom distance function, described below, that produces reduced sequences of integers that support the detection of network activities of interest. For the sake of simplicity, the custom distance function of block 340 is discussed with references to FIGS. 8 and 9. FIG. 8 illustrates exemplary process 800 for performing the custom distance function, in one embodiment. FIG. 9 illustrates exemplary groups of network packets as they are processed by exemplary process 800, in the one present embodiment.

Turning to FIG. 8, at block 810, the custom distance function identifies integers that appear within adjacent pairs of sequences of integers produced by block 340 (FIG. 3).

FIG. 9A illustrates exemplary sequences of integers 910-919. FIG. 9B illustrates exemplary integer "101", which appears in at least pairs of adjacent sequences of integers 910-911, 911-912, and 912-913. (Note, sequences of integers 914-919 are not illustrated for simplicity.) At block 810, the custom distance function also identifies the first instance of an identified integer in pairs of adjacent sequences of integers. FIG. 9C illustrates the first instance of "101" being identified in adjacent sequences of integers 910-911, 911-912, and 912-913.

At block 820 (FIG. 8), the custom distance function aligns the first instances of the identified integer in a pair of adjacent sequences of integers. FIG. 9D illustrates the alignment of the first instances of "101" in pairs of adjacent sequences of integers 910-911, 911-912, and 912-913.

At block 830 (FIG. 8), a reduced sequence of integers may be created, under some conditions, for a pair of adjacent sequences of integers. A reduced sequence of integers is created (for a pair of adjacent sequences of integers) if one or more of the integers that are common to the pair of adjacent groups of sequences of integers: (i) appears in the same order in the pair of adjacent groups of network packets, and (ii) has positions in the pair of adjacent groups of network packets that are within a first threshold distance. In one embodiment, the first threshold distance is four. If created, a reduced sequence of integers would comprise integers that satisfy requirements (i) and (ii) stated above (with respect to a pair of adjacent sequences of integers).

FIG. 9E illustrates that, when the first instance of "101" is aligned between sequences of integers 910 and 911, the integers "48" and "52" satisfy requirements (i) and (ii) stated above. Specifically, the integers "101", "48", and "52" appear in the same order in both sequences of integers 910 and 911. Further, the integer "48" appears in both sequences of integers 910 and 911 within the first threshold distance (of four, in the present embodiment). Thus, as shown in FIG. 9F, reduced sequence of integers 920 is created, and includes the sequence of integers "101 48 52". Also as shown in FIG. 9F, the integers "101" "48" and "52" in sequences of integers 911 and 912 also satisfy requirements (i) and (ii) stated above. Thus, reduced sequence of integers 921 is created, and includes the sequence of integers "101 48 52". Also as shown in FIG. 9F, the integers "53" and "101" in sequences of integers 912 and 913 also satisfy requirements (i) and (ii) stated above. Thus, reduced sequence of integers 922 is created, and includes the sequence of integers "53 101".

Blocks 810-830 repeat for other integers that appear within at least a pair of adjacent sequences of integers. For example, the integer "48" also appears in at least one pair of adjacent sequences of integers among sequences of integers 910-919. Thus, blocks 810-830 are repeated for 8-bit integer "48".

Figures 10A, 10B, 10C:
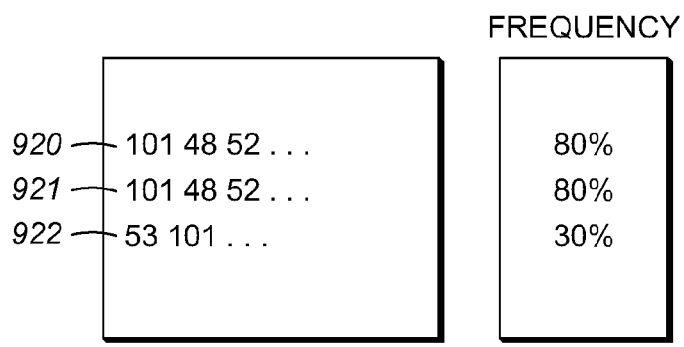
FIGS. 10(A)-(C) depict exemplary sequences of 8-bit integers.

At the completion of block 830 (which is an exemplary string function carried out in block 340 of FIG. 3), processing proceeds to block 350 (FIG. 3). At block 350, the frequency at which a reduced sequence of integers appears, within a second threshold distance, in the groups of network packets created at block 330 is determined. The first and second threshold distances may be the same or may be different. In one embodiment, the second threshold distance is four. FIG. 10A illustrates sequences of integers 910-919 that were created by block 330. In addition, FIG. 10B illustrates the appearance of reduced sequences of integers 920-922 (FIG. 9F) within sequences of integers 910-919. As shown, reduced sequence of integers 920 ("101 48 52") appears (within the exemplary second threshold distance of four) in eight out of the ten sequences of integers 910-919. Thus, a frequency of 80% is associated with reduced sequence of integers 920. For the same reason, a frequency of 80% is associated with reduced sequence of integers 921. Note, reduced sequences of integers 920 and 921 do not appear within the second threshold distance (of four, in this example) in sequence of integers 916, because the integers "101" and "48" are separated by more than four positions in group of network packets 916. Also as shown, reduced sequence of integers 922 ("53 101") appears (within the exemplary second threshold distance of four) in three out of the ten groups of network packets 910-919. Thus, a frequency of 30% is associated with reduced sequence of integers 922. The frequencies associated with reduced sequences of integers 920-921 are illustrated in FIG. 10B. These values, which indicate the frequencies with which reduced sequences of integers appear in order within a threshold distance in groups of network packets, may be referred to by the term "confidence values".

At block 360 (FIG. 3), reduced sequences of integers having confidence values below a threshold confidence value are discarded. In one embodiment, the threshold confidence value is between 80-90%. FIG. 10C illustrates the discarding of reduced sequence of integers 922. In addition, reduced sequences of integers 920 and 921 (which are the same) are de-duplicated and maintained as reduced sequence of integers 1030. For purposes of this disclosure, reduced sequence of integers 1030 may be referred to by the term "meta-expression".

Meta-expression 1030 represents the information that is sufficient to detect a network activity of interest within network traffic. Specifically, meta-expression 1030 is sufficient to detect the network activity represented by the initial input to process 300 (FIG. 3). Recall that the input to process 300 (FIG. 3) was a series of network packets that represents an attack by one network node against another network node using a computer virus, and the responses from the compromised network node.

Process 300 (FIG. 3) may be repeated for other types of network activities of interest. For example, process 300 may be performed using network traffic that indicates an attack by computer worm A to identify a meta-expression for detecting computer worm A and its variants. Process 300 may be performed again using network traffic that indicates an attack by computer exploit B to identify a meta-expression for detecting computer exploit B and its variants. Indeed, process 300 may be repeated for different computer viruses, malware, worms, Trojan horses, bots, intrusions (e.g., unauthorized access), exploits (e.g., escalation of privileges, violation of confidentiality), time-based attacks (e.g., Denial of Service), or the like, that are known to exist, in order to determine meta-expressions that can be used to identify those malicious computer instructions, as well as their variants.

Importantly, it has been determined that many different malicious network activities share the same meta-expressions. That is to say, two different network activities of interest (such as a known computer virus A and a known computer virus B) may share the same meta-expression and therefore are detectable using the single meta-expression. Further, a meta-expression that is generated from an existing computer virus, for example, can be used to detect all variations of the existing computer virus, regardless of the permutations, sizes, or characteristics of the variations (i.e., even if the variations are unknown). Only a completely new type of computer virus, and not a variation on an existing computer virus, would not be detected by the existing meta-expression. In this way, a handful of meta-expressions are sufficient to identify many, if not all, of the known computer viruses (which number between 2.5 to 8 million, depending on the source of authority), as well as their variants.

Figure 11:
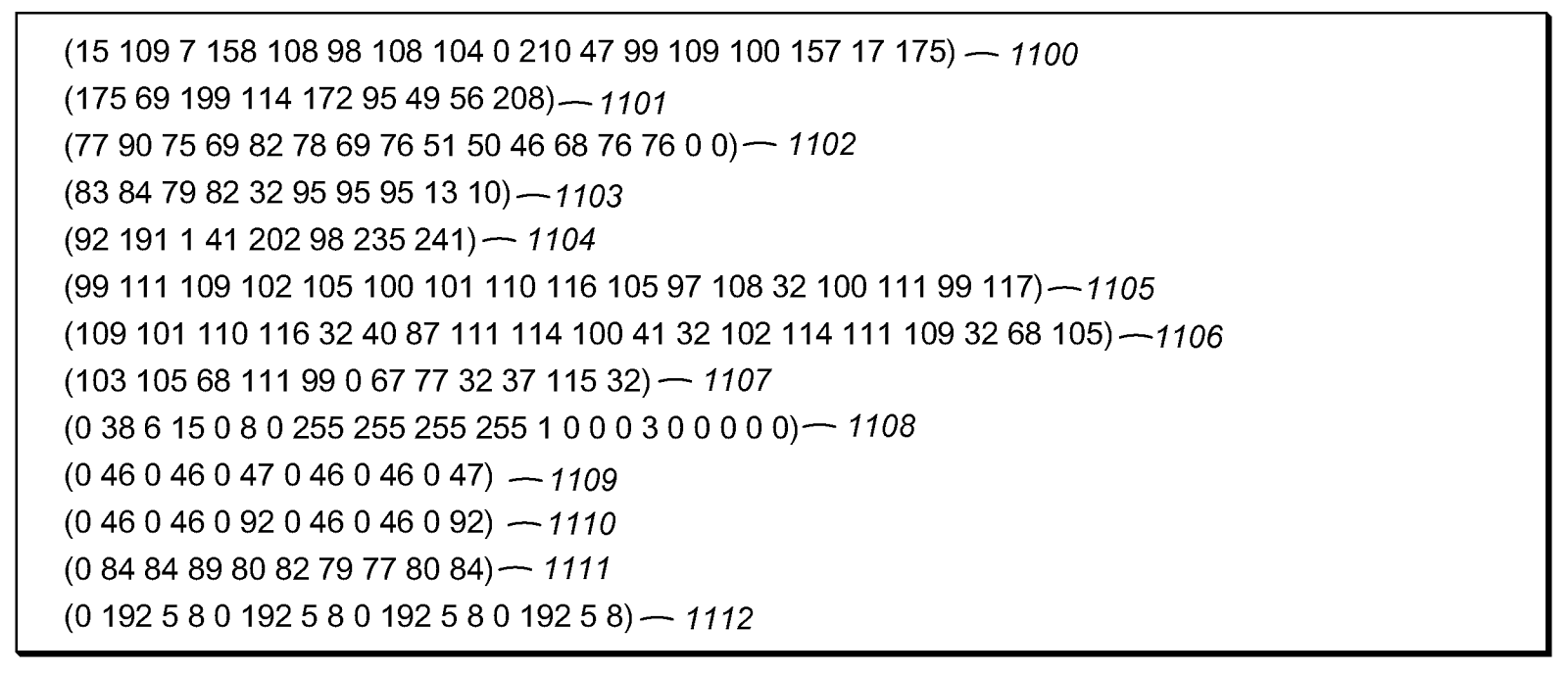

FIG. 11 illustrates 13 exemplary meta-expressions 1100-1112. Meta-expressions 1100-1112 span less than 200 (8-bit) bytes in total, and can be used to detect all variations of the existing computer virus as discussed above. This size stands in stark contrast to the size of a typical database of anti-virus signatures, which is on the order of 50 MB or more. The structure and minimal size of these meta-expressions provide tremendous computational efficiencies as compared to conventional computer security technologies.

3. Run-Time

The efficiency with which network activities of interest can be detected using the meta-expressions provided by process 300 are now discussed. At the completion of process 300 (which is an exemplary UTMS training process carried out at block 110 of FIG. 1), processing proceeds to block 120 of FIG. 1. At block 120, a UTMS utilizes meta-expressions to analyze network traffic, and to detect whether the network traffic is normal or abnormal. Processing at block 120 begins with the grouping of a series of bidirectional traffic between two network nodes. For this purpose, the techniques of block 310 (FIG. 3) may be used. Next, the groups of network packets are filtered for relevant information. For this purpose, the techniques of block 320 (FIG. 3) may be used. Next, the reassembled packets (containing relevant information), which form new groups of network traffic, are converted into sequences of integers. The bit size of the integers used during run-time should be the same as the bit size of the integers used during training. In one embodiment, the integers are 8-bit in size. For purposes of converting reassembled packets into sequences of integers, the techniques of block 330 (FIG. 3) may be used.

The sequences of integers produced by block 330 are compared against one or more meta-expressions to determine if the network traffic that is being analyzed is normal or abnormal. A set of network traffic that is being analyzed is considered "abnormal" when two criteria are satisfied: (i) each integer in the meta-expression is present in the sequence of integers that corresponds to the network traffic, and (ii) each integer appears in the same order in both the corresponding sequence of integers and the meta-expression. Notably, a group of network packets is considered normal at the first instance in which condition (i) fails to hold true. (The failure of condition (ii) is less useful because a sequence of integers may have multiple instances of a particular integer, and all of the instances must fail condition (ii) in order for condition (ii) to fail as a whole.)

Figure 12:
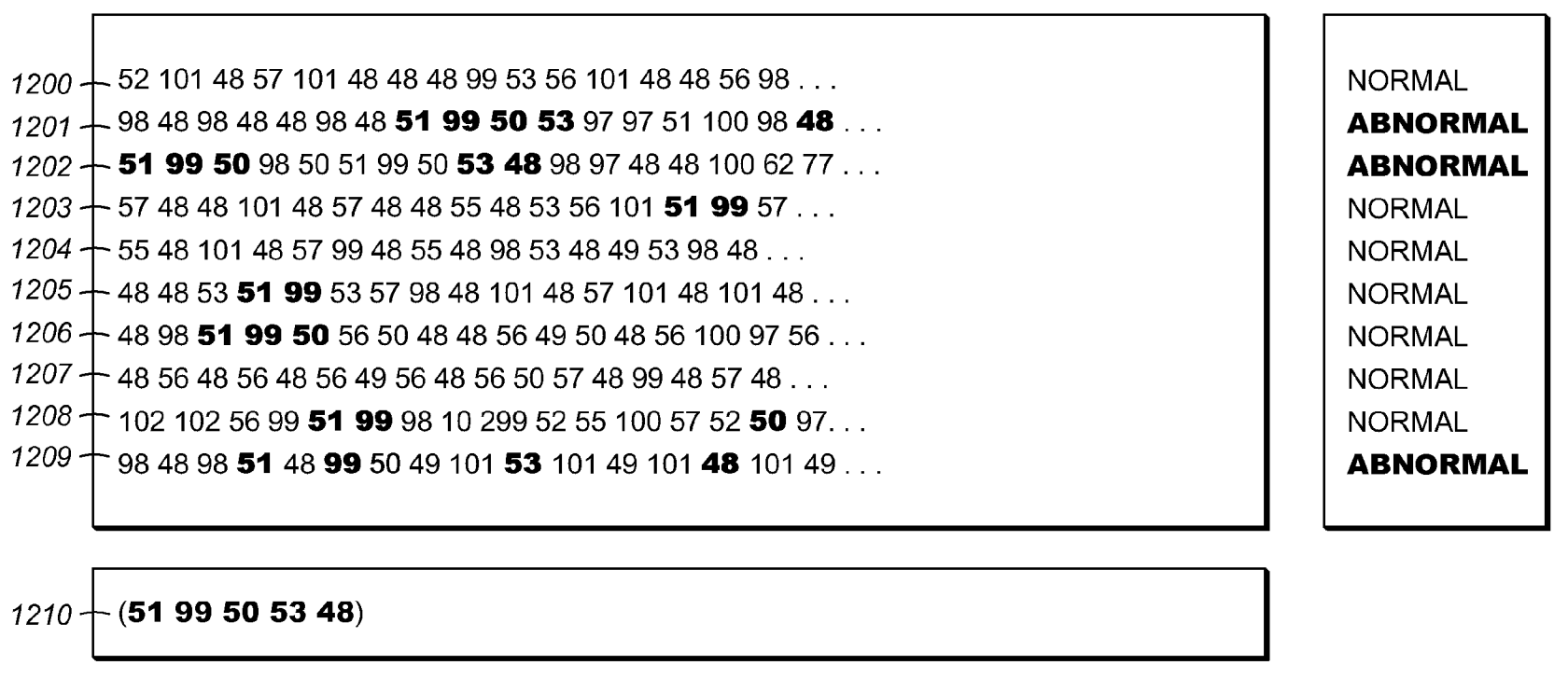

When abnormal traffic is detected, the UTMS follows decision block 130 to block 140, where appropriate responses are generated. When normal traffic is detected, the UTMS returns to block 120 and analyzes additional network traffic. Blocks 120-130 are discussed with reference to FIG. 12. FIG. 12 illustrates exemplary groups of network packets 1200-1209 and exemplary meta-expression 1210. Meta-expression 1210 may be one of the meta-expressions that were created during training (block 110 of FIG. 1). The length of meta-expression 1210 is shortened for simplicity. As shown, groups of network packets 1201, 1202, and 1209 contain all of the integers of meta-expression 1210, in the same order in which the integers appear in meta-expression 1210. Thus, groups of network packets 1201, 1202, and 1209 are considered abnormal. Groups of network packets 1200 and 1203-1208 do not contain all of the ordered integers of meta-expression 1210. Thus, groups of network packets 1200 and 1203-1208 are considered normal.

As is evident from the preceding discussion, at block 120, a UTMS performs many integer comparisons. Thus, optimization of integer comparisons is important to the efficiency of the UTMS. Recall that a set of network traffic is considered to be normal at the first instance in which an integer in the meta-expression is absent in the sequence of integers that correspond to the network traffic. Thus, the performance of the UTMS is improved if an early "normal" determination can be made. To this end, it is beneficial to structure the technique of block 120 such that the integer comparisons between a sequence of integers and a meta-expression terminates as soon as one integer from the meta-expression is identified as being absent in the sequence of integers.

In one embodiment, block 120 employs a nested computer programming language expression that returns an overall value of "failure" (e.g., a Boolean value) when any one of the nested levels returns a "false" condition. Thus, as soon as a UTMS identifies the absence of one integer (at any one of the nested levels), processing of the entire nested computer programming language expression terminates. The corresponding set of network traffic is thus identified as being normal (in which case, no additional threat detection is necessary), and a subsequent set of network traffic can be analyzed. For example, the LISP computer programming language allows for a nested expression in the form ((((A) (B)) (C)) (D)) that returns an overall value of "failure" if any one of expressions (A), (B), (C), and/or (D) is "false". In this example, the expression (A) may query whether the first integer in a meta-expression appears in a sequence of integers, and the expression (B) may query whether the second integer in the meta-expression appears in the sequence of integers, so forth.

At block 140, appropriate responses may be generated. One appropriate response may be a user or system alert that indicates the presence of a network activity of interest. Another appropriate response may be to scrub the response from the compromised network node, such that the intruding network node remains unaware of the "successful" intrusion. Yet another appropriate response may be to cloak the network node that is targeted for intrusion, so that the intruding network node can no longer reach the target network node.

Figure 13:
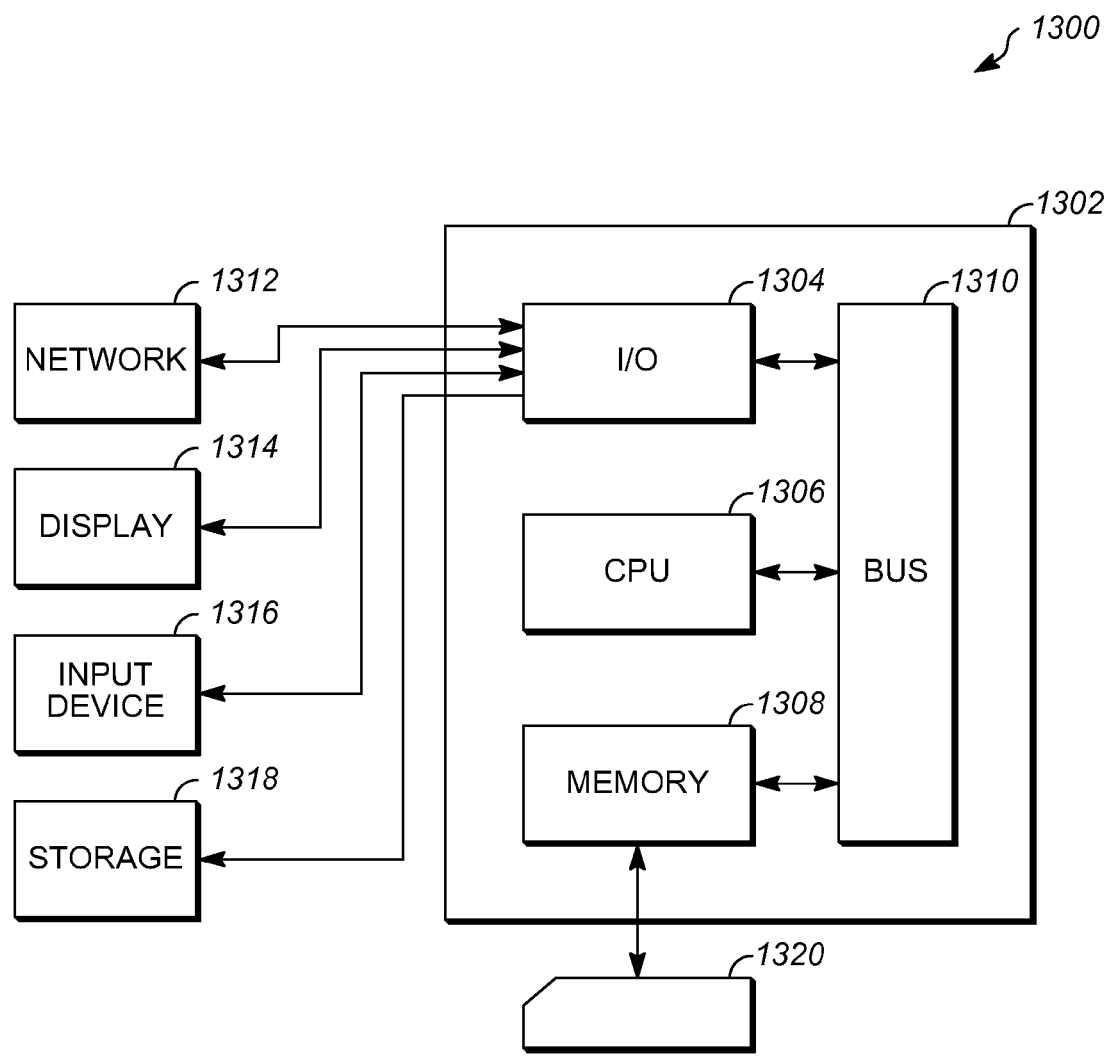
FIG. 13 depicts an exemplary computing system for detecting network activities of interest.

Portions of process 100 (FIG. 1) may be implemented in exemplary computing system 1300 illustrated in FIG. 13. In some embodiments, computing system 1300 is a network device, such as a router, gateway, and a firewall, or the like. In some embodiments, computing system 1300 is a gateway device, such as a modem, or the like. In some embodiments, computing system 1300 is a mobile device, such as a desktop computer, a laptop computer, a cellular phone, a tablet, or the like. In some embodiments, computing system 1300 is a network interface "card". Notably, the training aspects of process 100 (i.e., block 110) and the run-time aspects of process 100 (i.e., blocks 120-140) may be implemented onto the same, or onto different computing systems.

As shown in FIG. 13, the computing system 1300 includes a computer motherboard 1302 with bus 1310 that connects I/O section 1304, one or more central processing units (CPU) 1306, and a memory section 1308 together. Memory section 1308 may have memory module 1320 related to it. Memory module 1320 may be, for example, a flash memory and/or a removable memory device. The I/O section 1304 is connected to network interface 1312, which receives and/or transmits network packets. I/O section 1304 may be connected to display 1314, input device 1316, and/or storage unit 1318. Memory section 1308, memory module 1320, and/or storage unit 1322 can store (e.g., tangibly embody) computer-readable medium that contain computer-executable instructions and/or data for performing any one of the above-described processes using CPU 1306. The computer-executable instructions may be written, for example, in a general-purpose programming language (e.g., LISP, C) or some specialized application-specific language. Input device 1316 may be a USB port supporting input from USB-compliant devices, such as a keyboard, a mouse, a memory stick, or the like. At least some values based on the results of the above-described processes can be saved into memory such as memory 1308, memory module 1320, and/or disk storage unit 1318 for subsequent use.

Portions of process 100 (FIG. 1) also may be implemented into a processor by way of specifically arranged integrated circuits (e.g., application-specific integrated circuits). In some embodiments, the integrated circuit can be part of the main processor of a device, such as the main processor of a cellular phone. In some embodiments, the integrated circuit can be part of an auxiliary processor of a device, such as a processor that is connected to the motherboard of a laptop. The integrated circuits can contain computer-executable instructions and/or data for perform any one of the above-described processes. The computer-executable instructions may be written, for example, in a specialized application-specific (e.g., processor-specific) language.

In some embodiments, computer-executable instructions based on the C programming language that total less than 1 MB are sufficient to carry out process 100 (FIG. 1). Execution of these computer-executable instructions requires no more than 300 kilobytes (16-bit bytes) of run-time memory (e.g., random access memory). Modern computing systems and/or processors are well capable processing computer-executable instruction of these sizes. Indeed, in these embodiments, network interface bandwidth (i.e., input bandwidth), not processor speed, is typically the gating factor to processing even higher volumes of network traffic.

Although only certain exemplary embodiments have been described in detail above, those skilled in the art will readily appreciate that many modifications are possible in the exemplary embodiments without materially departing from the novel teachings and advantages of this disclosure. Aspects of embodiments disclosed above can be combined in other combinations to form additional embodiments. All such modifications are intended to be included within the scope of this technology.

For instance, in some embodiments, the above-described techniques may be used to detect other types of electronic information of interest. One particularly useful adaptation of the foregoing techniques is the detection of deleterious tissue, such as tumors, present in medical radiology images. That is, exemplary process 100 may be adapted to support the detection of information of interest in computer imaging by a computer imaging system.

Figure 14:
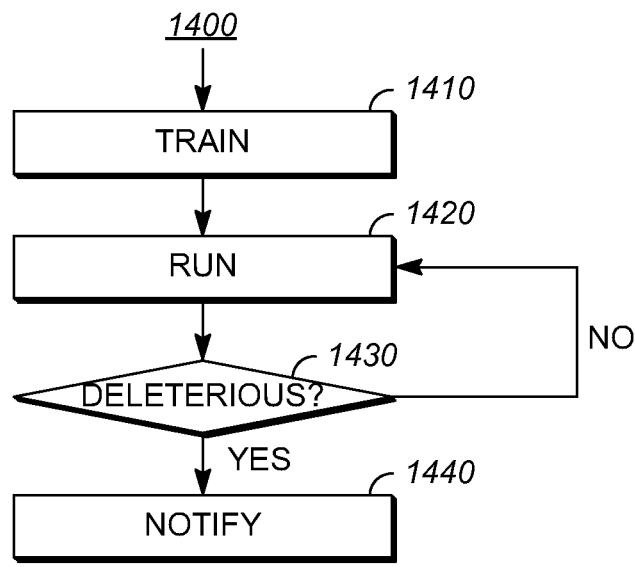
FIG. 14 depicts an exemplary process for detecting other electronic information of interest.

FIG. 14 illustrates process 1400, which represents one possible adaptation of process 100 for detecting deleterious tissue in radiology images. At block 1410, a computer imaging system is trained to recognize characteristics in radiology images that are associated with deleterious tissue. Specifically, the computer imaging system may obtain different radiology images that have been verified by doctors as showing deleterious tissue. From the pixel data of the radiology images, the computer imaging system identifies bounded sequences of data (i.e., a meta-expression) that can be used later to identify the presence of similar deleterious tissues in other, unknown (i.e., not yet verified by doctors) radiology images.

At block 1420, the computer imaging system obtains an unknown radiology image that may or may not show deleterious tissue. The computer imaging system determines, at block 1430, whether the unknown radiology image contains the same bounded sequence of data that was identified at block 1410. If the same bounded sequence of data is found in the unknown image, the computer imaging system notifies a user at block 1440 that deleterious tissue is found in the unknown radiology image.

Figure 15:
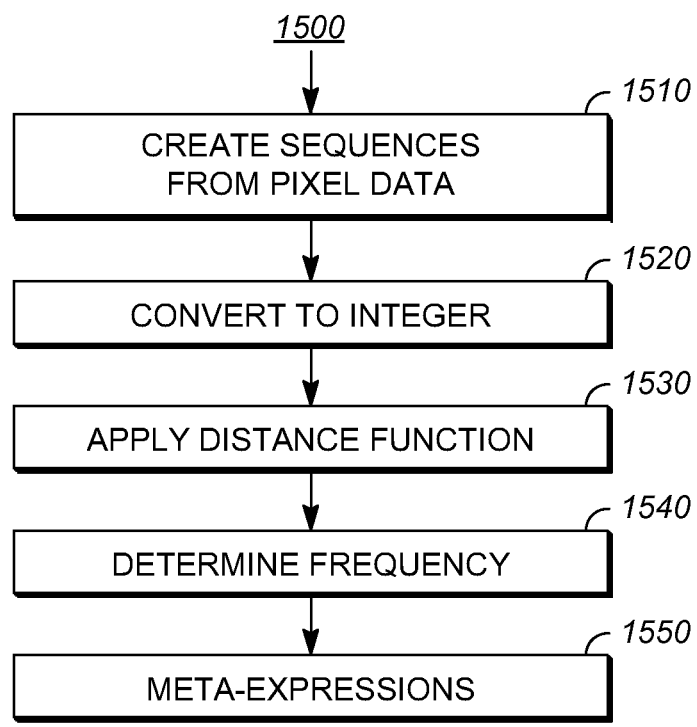
FIG. 15 depicts an exemplary process for training a computer imaging system.

FIG. 15 illustrates exemplary process 1500 for producing meta-expressions as described above. In some embodiments, process 1500 may perform the features of block 1410 (FIG. 14). At block 1510 of process 1500, pixel data from a radiology image is obtained by the computer imaging system and sequences of bitwise data are created from the radiology image.

Figure 16A:
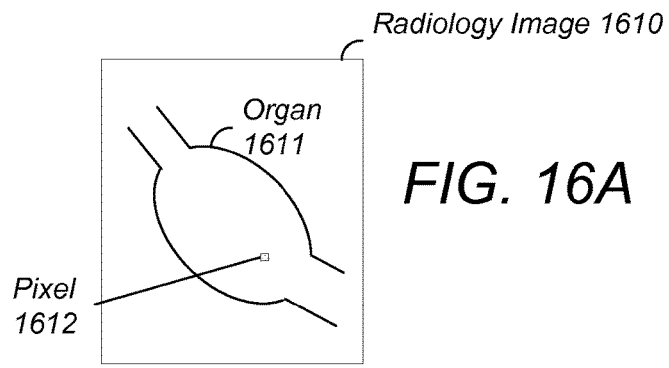
FIGS. 16(A)-(B) depict an exemplary radiology image.
Figure 16B:
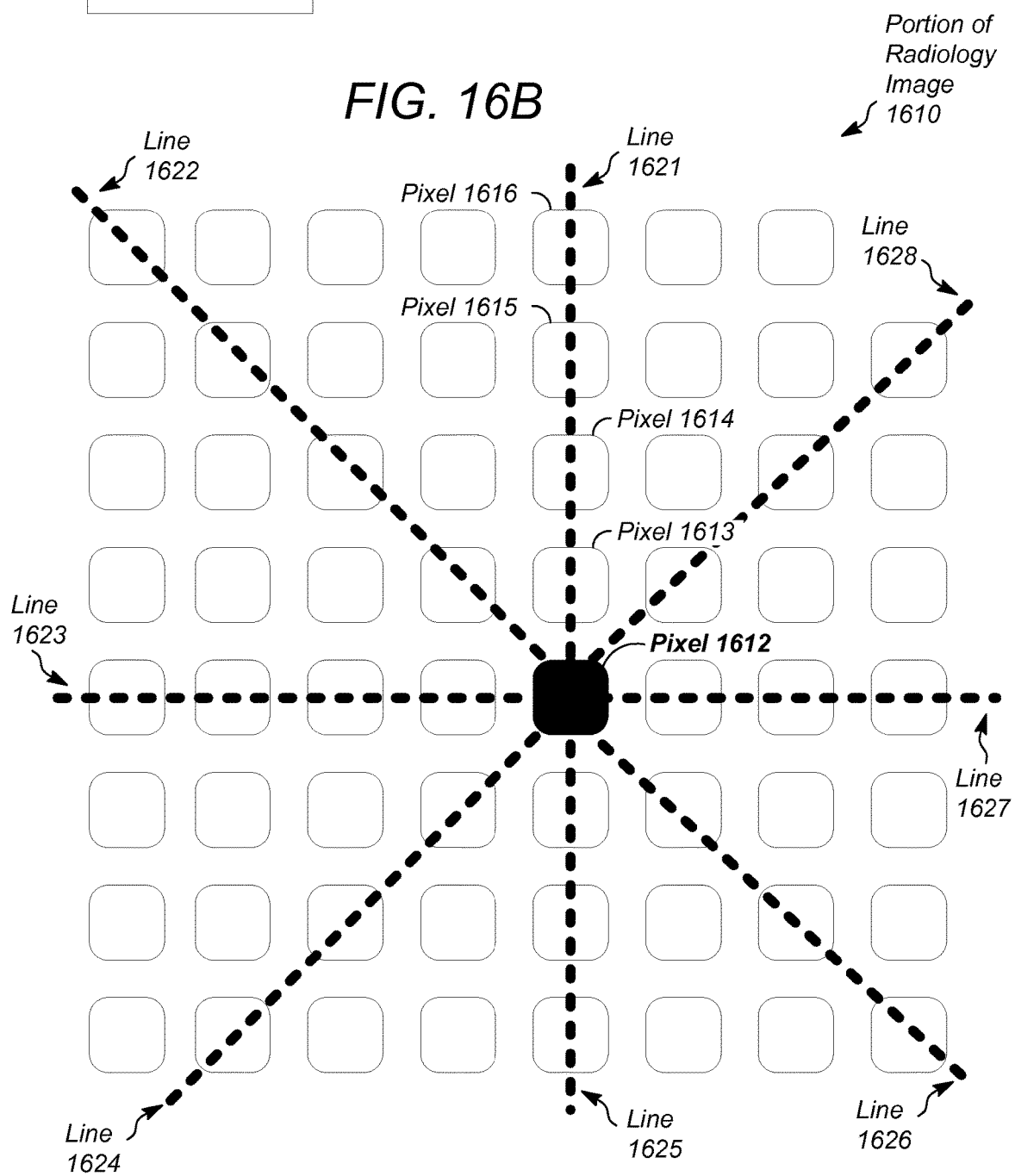

An exemplary creation of sequences of bitwise data is discussed with reference to FIGS. 16A-B. FIG. 16A illustrates radiology image 1610 containing organ 1611 having deleterious tissue. Radiology image 1610 comprises a number of pixels, including exemplary pixel 1612. Each pixel of radiology image 1610, including pixel 1612, may be processed at block 1510 (FIG. 15).

The processing of exemplary pixel 1612 is discussed with reference to FIG. 16B. In FIG. 16B, pixel 1612 is shown in larger scale with its surrounding pixels. During the processing of pixel 1612, imaginary lines 1621-1628 each extending outwards from pixel 1612 towards the edges of radiology image 1610 are determined by the computer imaging system. Each imaginary line intersects a number of other pixels between pixel 1612 and an edge of radiology image 1610. For example, imaginary line 1621 begins at pixel 1612 and intersects pixels 1613, 1614, 1615, and 1616, while imaginary line 1622 begins at pixel 1612 and intersects a number of other pixels.

The computer imaging system creates a sequence of bitwise data based on each imaginary line radiating from pixel 1612. Specifically, the value of each pixel that is intersected by an imaginary line is stored in sequence to form a sequence of bitwise data. The value of a pixel may represent, e.g., a RGB value of the pixel, a transparency of the pixel, or may be derived from some other meta-data that is provided by the computer image file to radiology image 1610. For example, if radiology image 1610 is a PNG image having a grayscale color depth of 16-bits at each pixel, a sequence of 80 bits may be created based on the values of pixels 1612-1616, which are intersected by imaginary line 1621) of 16-bits each. Another sequence of 80 bits may be created based on the five pixels intersected by imaginary line 1622. In this way, multiple sequences of bitwise data may be created for each pixel of a radiology image. The lengths of different bit strings may vary based on the distance between a pixel and an edge of the radiology image that is being processed. This process may repeat for each pixel in radiology image 1610.

At block 1520, the contents of the sequences of bitwise data produced at block 1510 are converted into integers, thereby producing one sequence of integers for each sequence of bitwise data. In one embodiment, 8-bit integers are used, meaning that a sequence of 80 bits is converted into a sequence of ten 8-bit integers. At blocks 1530-1540, a distance function is used to identify characteristics from the sequences of integers produced by block 1520. Blocks 1530-1540 may utilize the techniques of blocks 340-350

(FIG. 3). At block 1550, meta-expressions that may be used to identify deleterious tissue similar to those in present in organ 1610 (FIG. 16A) are determined. Block 1550 may utilize the techniques of block 360 (FIG. 3).

Portions of process 1400 (FIG. 14) may be implemented in exemplary computing system 1300 illustrated in FIG. 13. In this way, meta-expressions useful for determining whether a radiology image shows deleterious tissue can be created, and optionally, the meta-expressions may be used to determine the presence of deleterious tissue in radiology images.

What is claimed is:

1. A computer-implemented method for detecting a visual characteristic of interest, the method comprising:
    obtaining an image, wherein the image comprises a plurality of pixels within a plurality of boundaries, wherein the plurality of pixels comprises at least one pixel representing the visual characteristic of interest;
    creating first pixel data based on a value associated with the pixel and a value associated with a first intervening pixel, wherein the first intervening pixel is positioned along a straight line between the pixel and a first boundary of the image;
    converting bits of at least a portion of the first pixel data into a first sequence of integers;
    creating second pixel data based on the value associated with the pixel and a value associated with a second intervening pixel, wherein the second intervening pixel is located between the pixel and a second boundary of the image, the second boundary different from the first boundary;
    converting bits of at least a portion of the second pixel data into a second sequence of integers;
    determining a similarity metric between the first sequence of integers and the second sequence of integers using a distance function;
    creating a third sequence of integers based on the similarity metric, wherein the third sequence of integers includes integers common to the first sequence of integers and the second sequence of integers, wherein the common integers appear in the same order in both the first sequence of integers and the second sequence of integers, wherein the third sequence of integers facilitates the identification of the visual characteristic of interest in other images; and
    storing the third sequence of integers.

2. The computer-implemented method of claim 1, wherein:
    the first pixel data represent at least one of a grayscale value, an RGB value, or a transparency value of the pixel, the first intervening pixel, and a plurality of other pixels between the first intervening pixel and the first boundary of the image.

3. The computer-implemented method of claim 1, wherein the first sequence of integers and the second sequence of integers have at least a common integer, wherein the similarity metric represents a difference between a position of the common integer in the first sequence of integers and a position of the common integer in the second sequence, and wherein creating a third sequence of integers based on the similarity metric comprises including the common integer as part of the third sequence of integers if the difference is within a pre-determined distance.

4. The computer-implemented method of claim 3, wherein:
    the pre-determined distance is four.

5. The computer-implemented method of claim 1, wherein:
    the integers in the third sequence of integers appear in the same order, non-contiguously, in both the first sequence of integers and the second sequence of integers.

6. The computer-implemented method of claim 1, wherein the first sequence of integers and the second sequence integers are part of a plurality of sequences of integers created from pixel data of the image, the method further comprising:
    identifying a subset of the third sequence of integers that appear, in order, in at least a threshold percentage of the plurality of sequences of integers; and
    storing the subset as a fourth sequence of integers, wherein the fourth sequence of integers facilitates the identification of the visual characteristic of interest in other images.

7. The computer-implemented method of claim 6, wherein:
    the threshold percentage is at least 80%.

8. The computer-implemented method of claim 6, wherein:
    the subset of the third sequence of integers appear, in order, non-contiguously, in at least the threshold percentage of the plurality of sequences of integers.

9. The computer-implemented method of claim 1, wherein:
    the first, second, and third sequences of integers comprise 8-bit integers.

10. The computer-implemented method of claim 1, wherein:
    converting bits of at least a portion of the first pixel data into a first sequence of integers comprises grouping at least 8 sequential and contiguous bits of the first pixel data into 8-bit integers.

11. The computer-implemented method of claim 1, wherein:
    the image is chosen from a group consisting of:
        a radiology image,
        an magnetic resonance image
        an ultrasound image, and
        a sonographic image; and
    the visual characteristic of interest represents deleterious tissue.

12. A computer-implemented method for detecting a visual characteristic of interest, the method comprising:
    obtaining an image, wherein the image comprises a plurality of pixels within a plurality of boundaries, wherein the plurality of pixels comprises at least one pixel representing the visual characteristic of interest;
    creating pixel data based on a value associated with the pixel and a value associated with an intervening pixel, wherein the intervening pixel is positioned along a straight line between the pixel and a first boundary of the image;
    converting bits of at least a portion of the pixel data into a first sequence of integers;
    obtaining a second sequence of integers, wherein the second sequence of integers corresponds to presence of the visual characteristic of interest in the image;
    determining whether the integers in the second sequence of integers appear in the first sequence of integers in the same order; and
    initiating a computer-executable operation based on the determining.

13. The computer-implemented method of claim 12, wherein:

the pixel data represent at least one of a grayscale value, an RGB value, or a transparency value of the pixel, the intervening pixel, and a plurality of other pixels between the intervening pixel and the first boundary of the image.

14. The computer-implemented method of claim 12, wherein:
the integers in the second sequence of integers appear in the first sequence of integers in the same order, contiguously or non-contiguously; and
the computer-executable operation is initiated.

15. The computer-implemented method of claim 12, wherein:
the computer-executable operation comprises providing a notification through a user interface.

16. The computer-implemented method of claim 12, wherein the image is chosen from a group consisting of:
a radiology image,
an magnetic resonance image
an ultrasound image, and
a sonographic image; and
wherein the visual characteristic of interest represents deleterious tissue.

17. A computing device for detecting a visual characteristic of interest, comprising:
a data input port, wherein the data input port is adapted to receive data representing an image, wherein the image comprises a plurality of pixels within a plurality of boundaries, wherein the plurality of pixels comprises at least one pixel representing the visual characteristic of interest;
a processor connected to the data input port, wherein the processor is adapted to:
create first pixel data based on a value associated with the pixel and a value associated with a first intervening pixel, wherein the first intervening pixel is positioned along a straight line between the pixel and a first boundary of the image;
convert bits of at least a portion of the first pixel data into a first sequence of integers;
create second pixel data based on the value associated with the pixel and a value associated with a second intervening pixel, wherein the second intervening pixel is located between the pixel and a second boundary of the image, the second boundary different from the first boundary;
convert bits of at least a portion of the second pixel data into a second sequence of integers;
determine a similarity metric between the first sequence of integers and the second sequence of integers using a distance function; and
create a third sequence of integers based on the similarity metric, wherein the third sequence of integers includes integers common to the first sequence of integers and the second sequence of integers, wherein the common integers appear in the same order in both the first sequence of integers and the second sequence of integers; and
a memory connected to the processor, wherein the memory is adapted to store the third sequence of integers, wherein the stored third sequence of integers is used to detect the presence of the visual characteristic of interest.

18. The computing device of claim 17, wherein:
the first pixel data represent at least one of a grayscale value, an RGB value, or a transparency value of the pixel, the first intervening pixel, and a plurality of other pixels between the first intervening pixel and the first boundary of the image.

19. The computing device of claim 17,
wherein the first sequence of integers and the second sequence of integers have at least a common integer,
wherein the similarity metric represents a difference between a position of the common integer in the first sequence of integers and a position of the common integer in the second sequence, and
wherein the processor creates a third sequence of integers based on the similarity metric by including the common integer as part of the third sequence of integers if the difference is within a pre-determined distance.

20. The computing device of claim 19, wherein:
the pre-determined distance is four.

21. The computing device of claim 17, wherein:
the integers in the third sequence of integers appear in the same order, non-contiguously, in both the first sequence of integers and the second sequence of integers.

22. The computing device of claim 17, wherein the first sequence of integers and the second sequence integers are part of a plurality of sequences of integers created from pixel data of the image, the processor further adapted to:
identify a subset of the third sequence of integers that appear, in order, in at least a threshold percentage of the plurality of sequences of integers; and
store the subset as a fourth sequence of integers, wherein the fourth sequence of integers facilitates the identification of the visual characteristic of interest in other images.

23. The computing device of claim 22, wherein:
the threshold percentage is at least 80%.

24. The computing device of claim 17, wherein:
the subset of the third sequence of integers appear, in order, non-contiguously, in at least the threshold percentage of the plurality of sequences of integers.

25. The computing device of claim 17, wherein:
the first, second, and third sequences of integers comprise 8-bit integers.

26. The computing device of claim 17, wherein:
the processor is adapted to convert bits of at least a portion of the first pixel data into a first sequence of integers by grouping at least 8 sequential and contiguous bits of the first pixel data into 8-bit integers.

27. The computing device of claim 17, wherein the image is chosen from a group consisting of:
a radiology image,
an magnetic resonance image
an ultrasound image, and
a sonographic image; and
wherein the visual characteristic of interest represents deleterious tissue.

28. A non-transitory computer-readable storage medium having computer-executable instructions for detecting a visual characteristic of interest, the computer-executable instructions comprising instructions for:
obtaining an image, wherein the image comprises a plurality of pixels within a plurality of boundaries, wherein the plurality of pixels comprises at least one pixel representing the visual characteristic of interest;
creating first pixel data based on a value associated with the pixel and a value associated with a first intervening pixel, wherein the first intervening pixel is positioned along a straight line between the pixel and a first boundary of the image;

converting bits of at least a portion of the first pixel data into a first sequence of integers;

creating second pixel data based on the value associated with the pixel and a value associated with a second intervening pixel, wherein the second intervening pixel is located along a straight line between the pixel and a second boundary of the image, the second boundary different from the first boundary;

converting bits of at least a portion of the second pixel data into a second sequence of integers;

determining a similarity metric between the first sequence of integers and the second sequence of integers using a distance function;

creating a third sequence of integers based on the similarity metric, wherein the third sequence of integers includes integers common to the first sequence of integers and the second sequence of integers, wherein the common integers appear in the same order in both the first sequence of integers and the second sequence of integers, wherein the third sequence of integers facilitates the identification of the visual characteristic of interest in other images; and storing the third sequence of integers.

29. The non-transitory computer-readable medium of claim 28, wherein:

the first pixel data represent at least one of a grayscale value, an RGB value, or a transparency value of the pixel, the first intervening pixel, and a plurality of other pixels between the first intervening pixel and the first boundary of the image.

30. The non-transitory computer-readable medium of claim 28, wherein the first sequence of integers and the second sequence of integers have at least a common integer, wherein the similarity metric represents a difference between a position of the common integer in the first sequence of integers and a position of the common integer in the second sequence, and wherein creating a third sequence of integers based on the similarity metric comprises including the common integer as part of the third sequence of integers if the difference is within a pre-determined distance.

31. The non-transitory computer-readable medium of claim 30, wherein:

the pre-determined distance is four.

32. The non-transitory computer-readable medium of claim 28, wherein:

the integers in the third sequence of integers appear in the same order, non-contiguously, in both the first sequence of integers and the second sequence of integers.

33. The non-transitory computer-readable medium of claim 28, wherein the first sequence of integers and the second sequence integers are part of a plurality of sequences of integers created from pixel data of the image, the computer-executable instructions further comprising instructions for:

identifying a subset of the third sequence of integers that appear, in order, in at least a threshold percentage of the plurality of sequences of integers; and storing the subset as a fourth sequence of integers, wherein the fourth sequence of integers facilitates the identification of the visual characteristic of interest in other images.

34. The non-transitory computer-readable medium of claim 33, wherein:

the threshold percentage is at least 80%.

35. The non-transitory computer-readable medium of claim 33, wherein:

the subset of the third sequence of integers appear, in order, non-contiguously, in at least the threshold percentage of the plurality of sequences of integers.

36. The non-transitory computer-readable medium of claim 28, wherein:

the first, second, and third sequences of integers comprise 8-bit integers.

37. The non-transitory computer-readable medium of claim 28, wherein:

converting bits of at least a portion of the first pixel data into a first sequence of integers comprises grouping at least 8 sequential and contiguous bits of the first pixel data into 8-bit integers.

38. The non-transitory computer-implemented method of claim 28, wherein the image is chosen from a group consisting of:

a radiology image,
an magnetic resonance image
an ultrasound image, and
a sonographic image; and
wherein the visual characteristic of interest represents deleterious tissue.

* * * * *